US012756734B2

(12) United States Patent
Barbosa et al.

(10) Patent No.: US 12,756,734 B2
(45) Date of Patent: Oct. 6, 2026

(54) AUTOMATED RESPONSE TO COMPUTER VULNERABILITIES

(71) Applicant: Fortinet, Inc., Sunnyvale, CA (US)

(72) Inventors: Michel Ferreira Barbosa, São Paulo (BR); Paulo Cesar Raponi, Uberaba (BR)

( * ) Notice: Subject to any disclaimer, the term of this patent is extended or adjusted under 35 U.S.C. 154(b) by 340 days.

(21) Appl. No.: 17/566,810

(22) Filed: Dec. 31, 2021

(65) Prior Publication Data

US 2023/0216875 A1 Jul. 6, 2023

(51) Int. Cl.
*H04L 9/40* (2022.01)

(52) U.S. Cl.
CPC ...... *H04L 63/1433* (2013.01); *H04L 63/0227* (2013.01); *H04L 63/102* (2013.01)

(58) Field of Classification Search
CPC ............ H04L 63/1433; H04L 63/0227; H04L 63/102
USPC ............ 726/25
See application file for complete search history.

(56) References Cited

U.S. PATENT DOCUMENTS 9,317,692 B2 * 4/2016 Elder .................. H04L 63/1433
9,692,778 B1 * 6/2017 Mohanty ............. G06F 9/45533
10,503,908 B1 * 12/2019 Bellis .................. G06F 16/9032
10,754,958 B1 * 8/2020 Sidagni ................. G06F 21/577
2013/0247207 A1 * 9/2013 Hugard, IV ............ G06F 21/57 726/25
2014/0137257 A1 * 5/2014 Martinez ............. H04L 63/1433 726/25
2014/0189873 A1 * 7/2014 Elder .................. H04L 63/1433 726/25
2015/0033340 A1 * 1/2015 Giokas ................ H04L 63/1433 726/23
2015/0332054 A1 * 11/2015 Eck ..................... H04L 63/1416 726/25
2017/0109536 A1 * 4/2017 Stopel ................... G06F 21/577
2018/0013771 A1 * 1/2018 Crabtree ............. H04L 63/1416
2018/0129810 A1 * 5/2018 Kim .................. G06F 16/90344
2019/0102560 A1 * 4/2019 Zettel, II ............. G06F 11/3051
2019/0102564 A1 * 4/2019 Li ........................... G06F 21/57
2019/0147167 A1 * 5/2019 Kim ...................... G06F 40/143 726/25
2019/0156042 A1 * 5/2019 Kim ...................... G06F 16/258
2019/0236282 A1 * 8/2019 Hulick, Jr. ............ G06F 16/951
2020/0228560 A1 * 7/2020 Murthy ...................... G06F 8/65
2020/0257811 A1 * 8/2020 Tatarinov ............ G06F 11/3684
2020/0320208 A1 * 10/2020 Bhosale ................ G06F 21/577
2020/0327237 A1 * 10/2020 Shakarian ............... G06F 17/18
2020/0366706 A1 * 11/2020 Sexton ................ H04L 63/1425

(Continued)

*Primary Examiner* — Thanh T Le
(74) *Attorney, Agent, or Firm* — Law Office of Dorian Cartwright; Dorian Cartwright

(57) ABSTRACT

Each of the plurality of network assets on the private network is identified and categorized according to a CPE for storage in a device inventory database, and to generate an asset profile for each of the plurality of network assets. Attacks on the plurality of assets related to each of the identified CPEs are identified and monitored according to a CVE (common vulnerabilities exposures) format, and determine whether the CVE is relevant against the asset profile. Responsive to detecting a relevant CVE notification including CVE-id, impact on one or more network assets affected by the CVE based on the asset profiles is determined. The impact is either low impact, high impact and blocked, or high impact and unblocked.

6 Claims, 5 Drawing Sheets

(56) References Cited

U.S. PATENT DOCUMENTS

| | | | | |
|---|---|---|---|---|
| 2021/0152588 | A1* | 5/2021 | Cruz | G06F 8/658 |
| 2021/0360007 | A1* | 11/2021 | Paquin | G06N 3/09 |
| 2021/0367961 | A1* | 11/2021 | Kuppa | G06N 5/04 |
| 2022/0124114 | A1* | 4/2022 | Assiry | H04L 63/10 |
| 2022/0159028 | A1* | 5/2022 | Kumar | H04L 63/1433 |
| 2022/0201031 | A1* | 6/2022 | Choudha | H04L 63/1425 |
| 2022/0215102 | A1* | 7/2022 | Shakarian | G06F 21/577 |
| 2022/0217173 | A1* | 7/2022 | Cavallaro Corti | G06F 21/552 |
| 2022/0303300 | A1* | 9/2022 | Egan | H04L 63/1416 |
| 2022/0345483 | A1* | 10/2022 | Shua | H04L 9/0825 |
| 2023/0019180 | A1* | 1/2023 | de Nijs | G06F 21/577 |
| 2023/0075290 | A1* | 3/2023 | Wåreus | G06F 21/577 |
| 2023/0205892 | A1* | 6/2023 | Wareus | G06F 21/577<br>726/25 |
| 2023/0244791 | A1* | 8/2023 | Jadhav | G06F 21/577<br>726/25 |

* cited by examiner

AUTOMATED RESPONSE TO COMPUTER VULNERABILITIES

FIELD OF THE INVENTION

The invention relates generally to computer networking, and more specifically, to automatically assessing impact of attacks on the network assets.

BACKGROUND

Networked computers are vulnerable to attacks. The CVE (common vulnerability and exposure) is a key identifying a particular vulnerability. The CPE (common platform enumeration) matches a vulnerability with a particular computer component. The CPE dictionary is provided in XML format and is available to the public (e.g., cpe:<cpe_version>:<part>:<vendor>:<product>:<version>:<update>:<edition>:<language>:<sw_edition>:<target_sw>:<target_hw>:<other>). One authoritative CPE dictionary is maintained by NIST (National Institute of Standards and Technology). Values include part (application, hardware or operating system), vendor, product, version, update, edition and language.

Problematically, a majority of computer security products are made to reduce vulnerabilities and stop real-time attacks.

Therefore, what is needed is a robust technique for automatically assessing impact of attacks on the network assets.

SUMMARY

These shortcomings are addressed by the present disclosure of methods, computer program products, and systems for automatically assessing impact of attacks on the network assets.

In one embodiment, each of the plurality of network assets on the private network is identified and categorized according to a CPE for storage in a device inventory database, and to generate an asset profile for each of the plurality of network assets. Attacks on the plurality of assets related to each of the identified CPEs are identified and monitored according to a CVE (common vulnerabilities exposures) format and determine whether the CVE is relevant against the asset profile.

In another embodiment, responsive to detecting a relevant CVE notification including CVE-id, impact on one or more network assets affected by the CVE based on the asset profiles is determined. The impact is either low impact, high impact and blocked, or high impact and unblocked. Finally, a security action or other remediation action can be taken based on impact.

Advantageously, computer hardware and computer network performance are improved with enhanced security and attack remediation.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for providing proxy encryption services for automatically assessing impact of attacks on the network assets.

One of ordinary skill in the art will recognize many additional variations made possible by the succinct description of techniques below.

I. Systems for Automatic Network Attack Impact Assessment (FIGS. 1-2)

Figure 1:
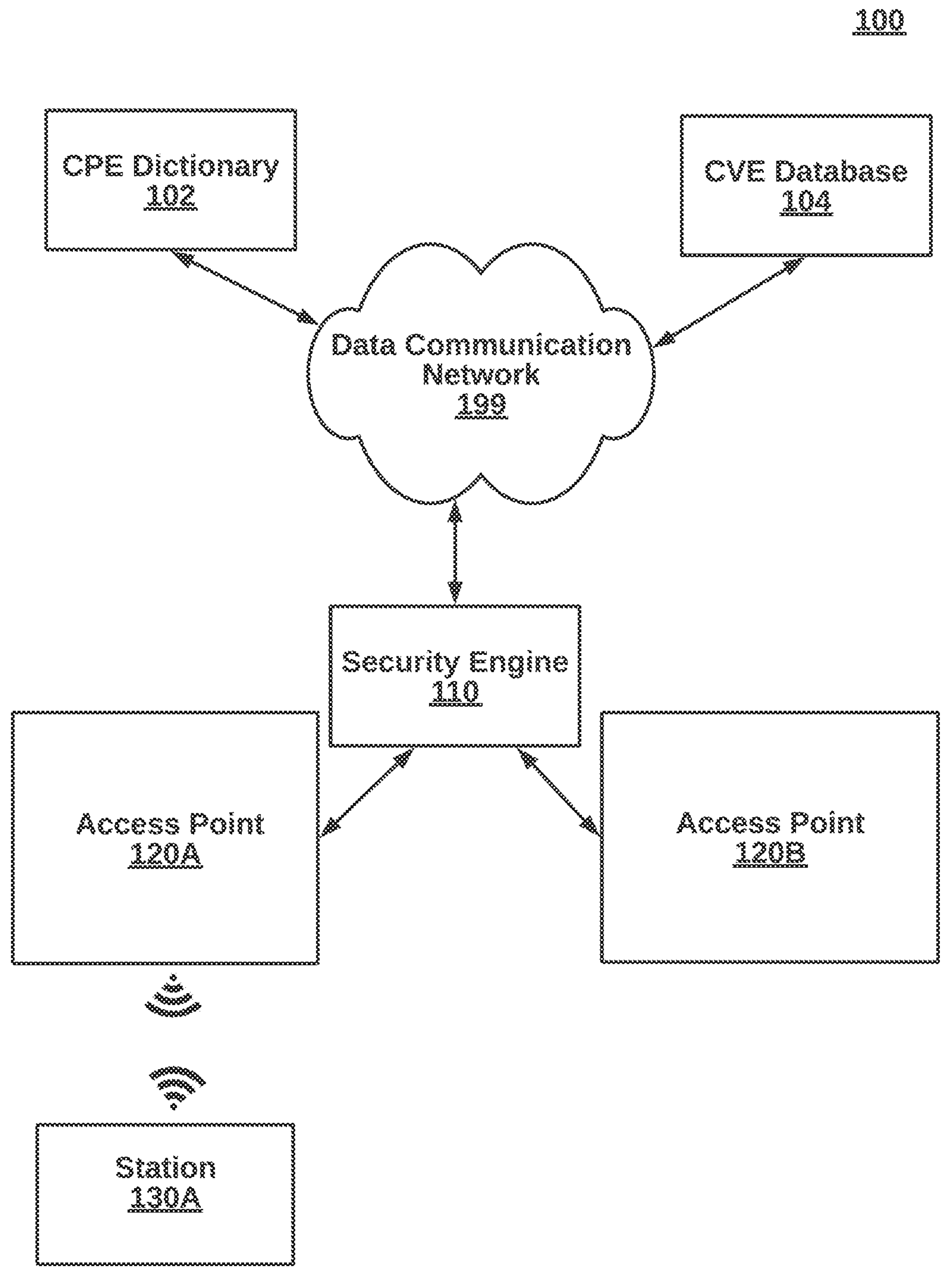
FIG. 1 is a high-level block diagram illustrating a system for automatically assessing impact of attacks on the network assets, according to an embodiment.
Figure 2:
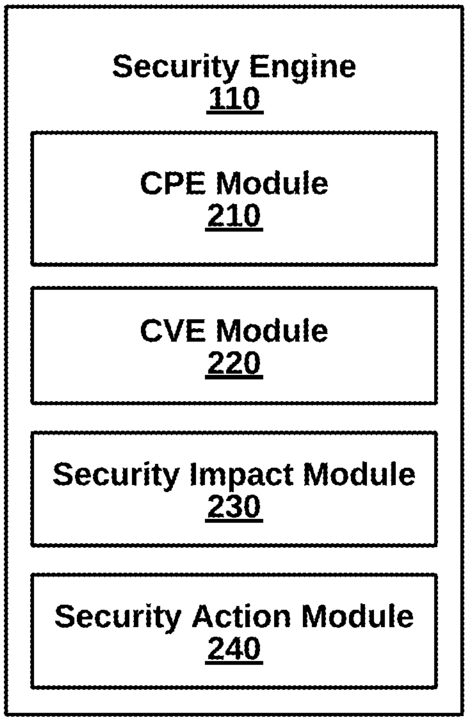
FIG. 2 is a more detailed block diagram illustrating of a security engine of the system of FIG. 1, according to an embodiment.

FIG. 1 is a high-level illustration of a system 100 for automatically assessing impact of attacks on the network assets, according to an embodiment. The system comprises a security engine 110 and access points 120A,B coupled to a data communication network 199. Many other configurations are possible, for example, with additional network components such routers, switches, repeaters, firewalls, and the like. Also, there can be many more or fewer clients in FIG. 1. The system components can be implemented in computer devices with non-transitory source code, such as set forth below with reference to FIG. 5.

The components of the system 100 are coupled in communication over the data communication network 199. Preferably, the security engine 110 and access points 120A,B are connected to the data communication system via hard wire. The station 130A is preferably connected to the access point 120A via a wireless channel. The data communication network 199 can be any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11.

In one embodiment, the security engine 110 categorizes hosts according to a standard CPE format of a CPE dictionary 102. If available, this information can be confirmed and enriched by external systems like vulnerability scanners, endpoint agents and others. This information is then registered into the device inventory database. The security engine 110 also monitors the network to identify and categorize attacks. Once an attack is identified by using the CVE-ID associated with the attack signature, it's possible to pull the list of known affected software configurations in CPE format from a CVE database 104. The list of affected CPEs is then compared against the list of existing CPEs in this environment in the device inventory database.

The outcomes of the comparison are based on: attack relevancy (e.g., the CVE-ID affects or not the target CPE) and attack status (e.g., the security engine blocked or only detected this attack). If the attack relevancy is low, (e.g., the target is not vulnerable to that CVE-ID), then the attack is classified as low impact. If attack relevancy is high, (e.g., the target is vulnerable to that CVE-ID), there are two possible outcomes: attack was blocked by the security engine 110 and attack was not blocked by the security engine 110. If blocked, the attack is high impact because the attack matches a targeted vulnerability, and the host is classified as critical risk. The classification should be sufficient to alert the network administrator that there's been active attempts to exploit a real vulnerability of this target and that patching should be expedited. If not blocked by the security engine 110, the host may have been successfully compromised. The attack is considered high impact, and the host is considered compromised and require immediate action from the administrator in order to start containment and cleanup measures.

FIG. 2 is a more detailed illustration of the security engine 110 of the system 100 of FIG. 1. The security engine includes a CPE module 210, a CVE module 220, an attack impact module 230 and a security action module 240. The modules can be implemented in source code stored in non-transitory memory executed by a processor. Alternatively, the modules can be implemented in hardware with microcode. The modules can be singular or representative of functionality spread over multiple components. Many other variations are possible.

The CPE module 210 can identify and categorize according to a CPE format each of the plurality of network assets on the private network for storage in a device inventory database, and to generate an asset profile for each of the plurality of network assets.

The CVE module 220 monitors and categorizes attacks on the plurality of assets related to each if the identified CPEs according to a CVE format, and determine whether the CVE is relevant against the asset profile.

The security impact module 230 responsive to detecting a relevant CVE notification including CVE-id, determines impact on one or more network assets affected by the CVE based on the asset profiles. The impact is either low impact, high impact and blocked, or high impact and unblocked.

The security action module 240 to take security action based on impact. Actions include mere notifications to network administrator or security reports. More aggressive actions can be to quarantine part of the network or block traffic from external networks. Network policies can direct automatic actions.

II. Methods for Automatic Network Attack Impact Assessment (FIG. 3-4)

Figure 3:
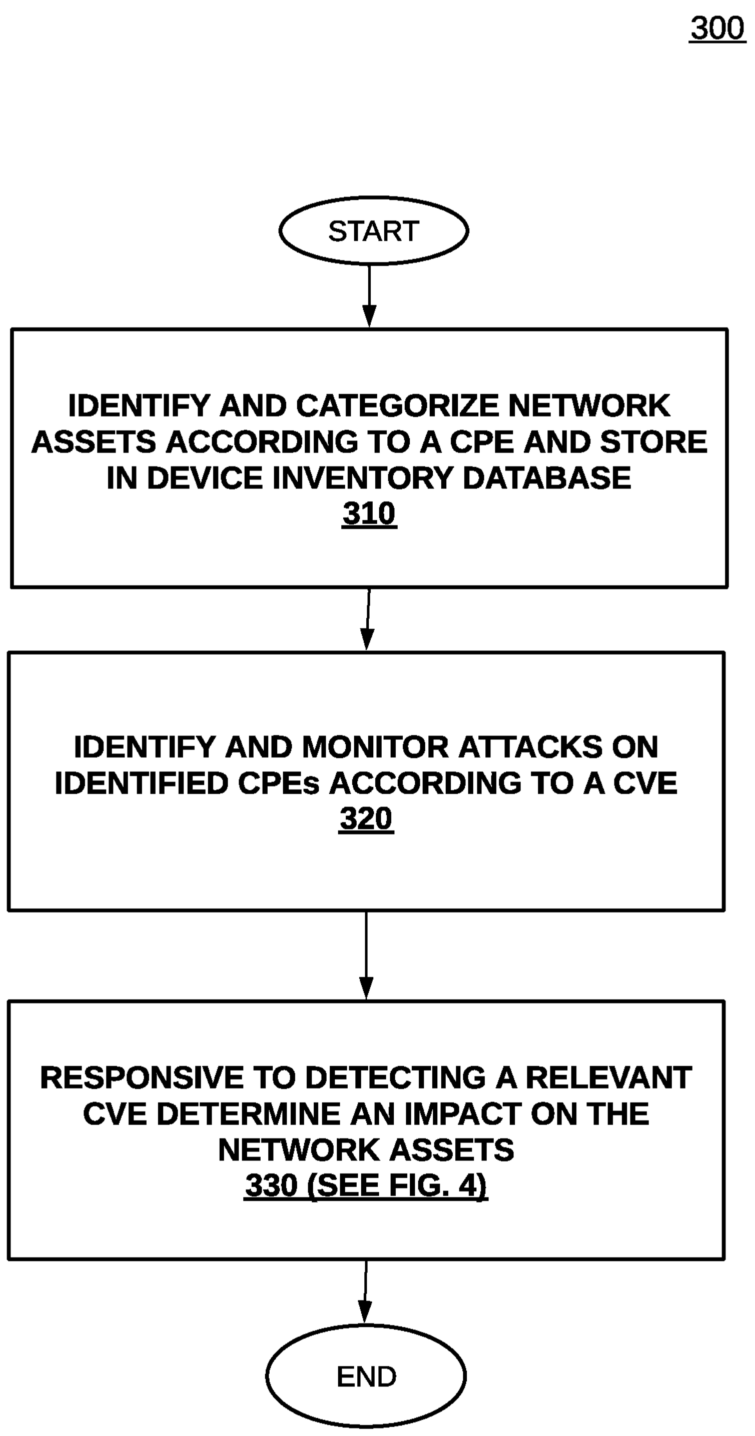
FIG. 3 is a high-level flow diagram illustrating a method for automatically assessing impact of attacks on the network assets, according to one preferred embodiment.
Figure 4:
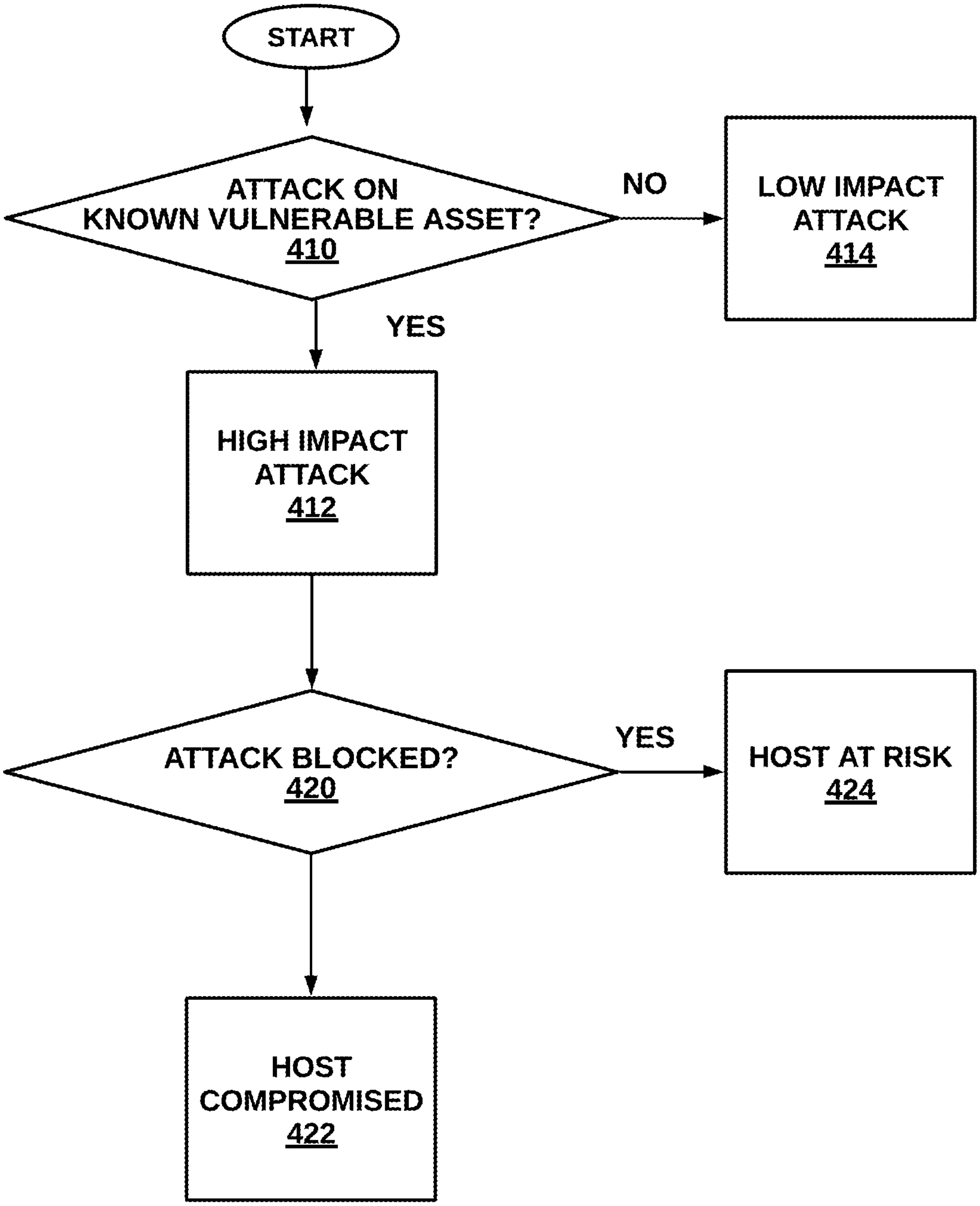
FIG. 4 is a more detailed flow diagram illustrating a step for determining an impact on network assets in the method of FIG. 3, according to one preferred embodiment.

FIG. 3 is a high-level flow diagram illustrating a method for automatically assessing impact of attacks on the network assets, according to one embodiment. The method 500 can be implemented, for example, by the system 100 of FIG. 1. The steps are merely representative groupings of functionality, as there can be more or fewer steps, and the steps can be performed in different orders. Many other variations of the method 500 are possible.

At step 310, each of the plurality of network assets on the private network is identified and categorized according to a CPE for storage in a device inventory database, and to generate an asset profile for each of the plurality of network assets.

At step 320, attacks on the plurality of assets related to each of the identified CPEs are identified and monitored according to a CVE (common vulnerabilities exposures) format, and determine whether the CVE is relevant against the asset profile.

At step 330, responsive to detecting a relevant CVE notification including CVE-id, impact on one or more network assets affected by the CVE based on the asset profiles is determined. The impact is either low impact, high impact and blocked, or high impact and unblocked, as shown in FIG. 4. In more detail, at step 410 if the attack is on a known vulnerable asset (e.g., from previous scanning), the attack is high impact at step 412, and if not on a known vulnerable asset, the attack is deemed low impact at step 414. Further, if the high impact attack was not blocked, then the host has been compromised at step 422. If the high impact attack was blocked then the host is considered at risk at step 424.

At step 340, a security action or other remediation action can be taken based on impact.

III. Generic Computing Environment (FIG. 5)

Figure 5:
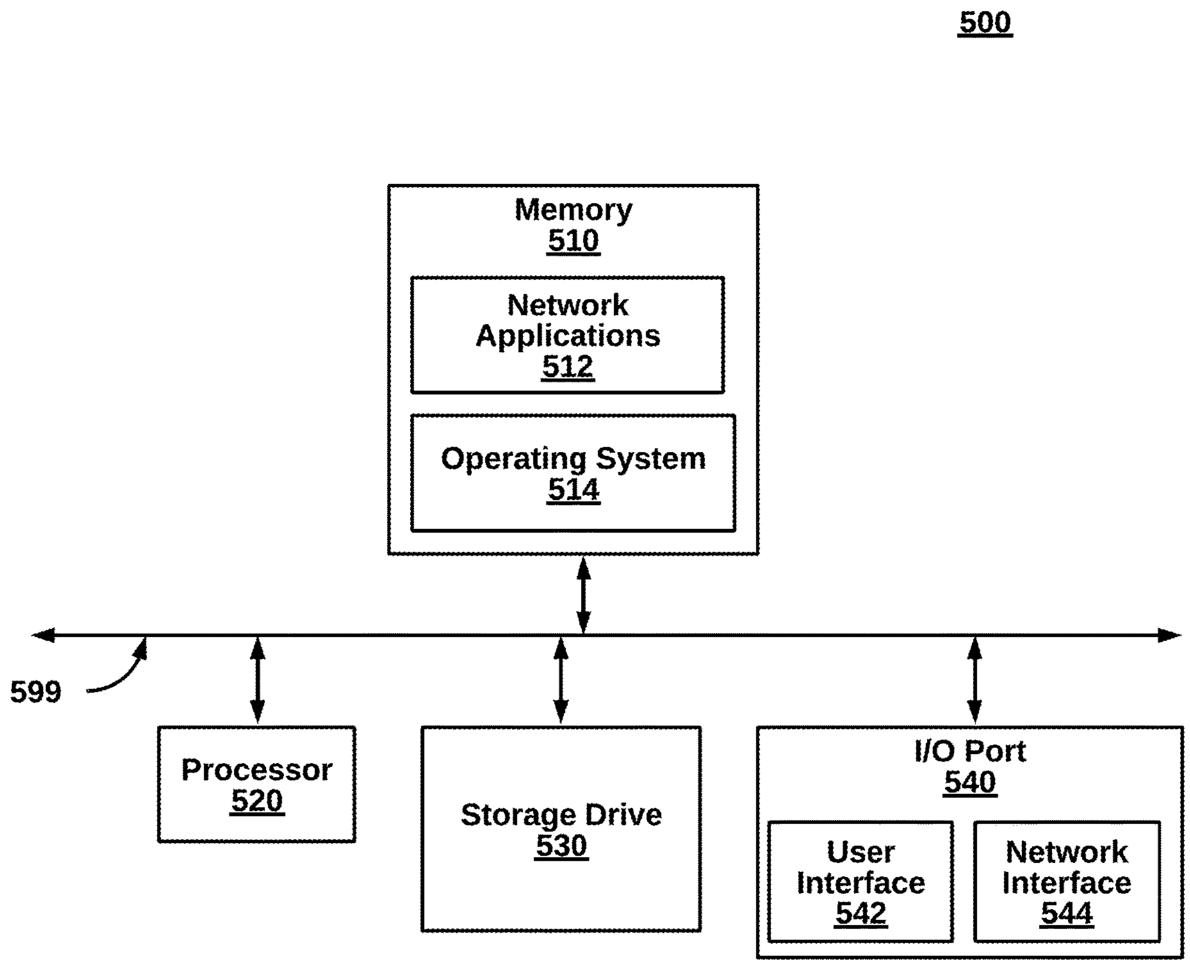
FIG. 5 is a computer system for implementing the system of FIG. 1, according to one embodiment.

FIG. 5 is a block diagram illustrating a computing device 500 capable of implementing components of the system, according to an embodiment. The computing device 500, of the present embodiment, includes a memory 510, a network processor 520, a storage drive 530, and an I/O port 540. Each of the components is coupled for electronic communication via a bus 599. Communication can be digital and/or analog and use any suitable protocol. The computing device 500 can be any of components of a network system (e.g., an access point, a router, a gateway, a firewall, a switch or a controller), other networking devices (e.g., an access point, a firewall device, a gateway, a router, or a wireless station), or a disconnected device.

Network applications 512 can be network browsers, daemons communicating with other network devices, network protocol software, and the like. An operating system 514 within the computing device 500 executes software, processes. Standard components of the real OS environment 514 include an API module, a process list, a hardware information module, a firmware information module, and a file system. The operating system 514 can be FORTIOS, one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The network processor 520 (e.g., optimized for IEEE 802.11, IEEE 802.11AC or IEEE 802.11AX), can be implemented by or supported by a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The network processor 520 can be single core, multiple core, or include more than one processing elements. The network processor 520 can be disposed on silicon or any other suitable material. The network processor 520 can receive and execute instructions and data stored in the memory 510 or the storage drive 530.

The storage drive 530 can be any non-volatile type of storage such as a magnetic disc, EEPROM (electronically erasable programmable read-only memory), Flash, or the like. The storage drive 530 stores code and data for applications.

The I/O port 540 further comprises a user interface 542 and a network interface 544. The user interface 542 can output to a display device and receive input from, for example, a keyboard. The network interface 544 (e.g., an RF antennae) connects to a medium such as Ethernet or Wi-Fi for data in network and output. Many of the functionalities described herein can be implemented with computer software, computer hardware, or a combination.

Computer software products (e.g., non-transitory computer products storing source code) may be written in any of various suitable programming languages, such as C, C++, C #, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer ⅔ routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A gateway device, coupled to a plurality of network assets on a private network and coupled to a public data communication network, for automatically assessing impact of attacks on the network assets from the public data communication network, the gateway device comprising:

- a processor;
- a communication interface, communicatively coupled to the data communication network; and
- a memory, communicatively coupled to the processor and storing:
  - a CPE (common platform enumerations) module to identify and categorize according to a CPE format each of the plurality of network assets on the private network for storage in a device inventory database, and to generate an asset profile for each of the plurality of network assets;
  - a CVE (common vulnerabilities exposures) module to monitor and categorize attacks on the plurality of assets related to each of the identified CPEs according to a CVE format, and determine whether the CVE format is relevant against the asset profiles;
  - an impact module to responsive to detecting an attack comprising a relevant CVE notification including a CVE-ID, determine impact on one or more network assets affected by the CVE based on the asset profiles, wherein the impact is either low impact, high impact and blocked, or high impact and unblocked; and
  - a security action module to take security action based on the impact.

2. The gateway device of claim 1, wherein the impact is determined as low impact if the asset profile was not vulnerable to the CVE-ID.

3. The gateway device of claim 1, wherein the impact is determined as high impact if the asset profile is determined to be vulnerable to the CVE-ID.

4. The gateway device of claim 1, wherein the CPE format comprises one value for application, hardware, or operating system, and one or more values for vendor, product, version, update and edition.

5. A non-transitory computer-readable media in a gateway device, coupled to a plurality of network assets on a private network and coupled to a public data communication network, when executed by a processor, performs a method of automatically assessing impact of attacks on the network assets from the public data communication network, the method comprising:

identifying and categorizing according to a CPE (common platform enumerations) format each of the plurality of network assets on the private network for storage in a device inventory database, and to generate an asset profile for each of the plurality of network assets;

monitoring and categorizing attacks on the plurality of assets related to each of the identified CPEs according to a CVE format, and determine whether the CVE (common vulnerabilities exposures) format is relevant against the asset profiles;

responsive to detecting an attack comprising a relevant CVE notification including a CVE-ID, determine impact on one or more network assets affected by the CVE based on the asset profiles, wherein the impact is determined from a list of impacts consisting of either low impact, high impact and blocked, and high impact and unblocked; and taking a security action based on the impact.

6. A method in a gateway device, coupled to a plurality of network assets on a private network and coupled to a public data communication network, for automatically assessing impact of attacks on the network assets from the public data communication network, the method comprising:

identifying and categorizing according to a CPE (common platform enumerations) format each of the plurality of network assets on the private network for storage in a device inventory database, and to generate an asset profile for each of the plurality of network assets;

monitoring and categorizing attacks on the plurality of assets related to each of the identified CPEs according to a CVE format, and determine whether the CVE (common vulnerabilities exposures) format is relevant against the asset profiles;

responsive to detecting an attack comprising a relevant CVE notification including a CVE-ID, determine impact on one or more network assets affected by the CVE based on the asset profiles, wherein the impact is determined from a list of impacts consisting of is low impact, high impact and blocked, and high impact and unblocked; and taking a security action based on the impact.

* * * * *